US011229953B2

(12) United States Patent
Blankenship et al.

(10) Patent No.: US 11,229,953 B2
(45) Date of Patent: *Jan. 25, 2022

(54) METHODS AND SYSTEMS FOR ADDITIVE MANUFACTURING

(71) Applicant: Lincoln Global, Inc., Santa Fe Springs, CA (US)

(72) Inventors: George D. Blankenship, Chardon, OH (US); William T. Matthews, Chesterland, OH (US); Michael A. Kottman, Cleveland, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 480 days.

This patent is subject to a terminal disclaimer.

(21) Appl. No.: 16/193,218

(22) Filed: Nov. 16, 2018

(65) Prior Publication Data
US 2019/0160538 A1 May 30, 2019

Related U.S. Application Data

(60) Provisional application No. 62/592,045, filed on Nov. 29, 2017.

(51) Int. Cl.
  *B22F 3/105* (2006.01)
  *B22F 10/20* (2021.01)
  (Continued)

(52) U.S. Cl.
  CPC .............. *B22F 10/20* (2021.01); *B23K 9/042* (2013.01); *B23K 9/044* (2013.01); *B23K 9/12* (2013.01);
  (Continued)

(58) Field of Classification Search
  CPC .... B22F 10/20; B22F 10/30; B22F 2005/002; B33Y 10/00; B33Y 50/02; B33Y 80/00;
  (Continued)

(56) References Cited

U.S. PATENT DOCUMENTS 3,581,053 A * 5/1971 Manz ..................... B23K 9/091
  219/137 R
3,624,345 A * 11/1971 Armstrong ............. B23K 9/188
  219/76.14

(Continued)

FOREIGN PATENT DOCUMENTS

| CN | 203109235 U | 8/2013 |
| CN | 103802317 A | 5/2014 |

(Continued)

OTHER PUBLICATIONS

Abe, et al.; "Dissimilar metal deposition with a stainless steel and nickel-based alloy using wire and arc-based additive manufacturing;" Precision Engineering; Elsevier; vol. 45; Dated Mar. 25, 2016; pp. 387-395.

(Continued)

*Primary Examiner* — Jimmy Chou
(74) *Attorney, Agent, or Firm* — Brad C. Spencer

(57) ABSTRACT

An additive manufacturing system includes an electrode head comprising an array of electrodes for depositing material to form a three-dimensional attachment structure connecting first and second prefabricated metallic parts. The array includes a first plurality of electrodes formed from a first metallic material having a first ductility and a first hardness, and a second plurality of electrodes formed from a second metallic material having a second ductility and a second hardness, wherein the first ductility is greater than the second ductility and the second hardness is greater than the first hardness. A power source provides power for heating each electrode. A drive roll system drives each electrode. A controller is connected to the power source to control operations of the additive manufacturing system to form an interior portion of the attachment structure using the first plurality of electrodes, and control the operations of the additive manufacturing system to form an exterior portion of (Continued)

the attachment structure using the second plurality of electrodes, such that ductility of the interior portion of the attachment structure is greater than ductility of the exterior portion of the attachment structure.

12 Claims, 10 Drawing Sheets

(51) Int. Cl.
| | |
|---|---|
| *B23K 9/04* | (2006.01) |
| *B23K 9/12* | (2006.01) |
| *B33Y 10/00* | (2015.01) |
| *B33Y 30/00* | (2015.01) |
| *B23K 26/323* | (2014.01) |
| *B23K 9/23* | (2006.01) |
| *B23K 26/08* | (2014.01) |
| *B23K 26/342* | (2014.01) |
| *B23K 26/346* | (2014.01) |
| *B22F 5/00* | (2006.01) |
| *B33Y 80/00* | (2015.01) |
| *B33Y 50/02* | (2015.01) |
| *B23K 103/18* | (2006.01) |
| *B22F 10/30* | (2021.01) |

(52) U.S. Cl.
CPC .............. *B23K 9/125* (2013.01); *B23K 9/232* (2013.01); *B23K 26/08* (2013.01); *B23K 26/323* (2015.10); *B23K 26/342* (2015.10); *B23K 26/346* (2015.10); *B33Y 10/00* (2014.12); *B33Y 30/00* (2014.12); *B22F 10/30* (2021.01); *B22F 2005/001* (2013.01); *B22F 2005/002* (2013.01); *B22F 2998/10* (2013.01); *B23K 2103/18* (2018.08); *B33Y 50/02* (2014.12); *B33Y 80/00* (2014.12)

(58) Field of Classification Search
CPC .... B23K 26/323; B23K 26/346; B23K 9/042; B23K 9/12; B23K 9/125; B23K 9/232; B23K 26/08; B23K 2103/18
USPC ...................................................... 219/76.14
See application file for complete search history.

(56) References Cited

U.S. PATENT DOCUMENTS

| | | | |
|---|---|---|---|
| 4,521,664 A * | 6/1985 | Miller ................ | B23K 31/025 219/125.12 |
| 4,983,807 A | 1/1991 | Yamada et al. | |
| 5,864,955 A | 2/1999 | Hirai | |
| 6,143,378 A * | 11/2000 | Harwell ................ | C23C 26/02 427/597 |
| 6,144,008 A | 11/2000 | Rabinovich | |
| 6,209,420 B1 | 4/2001 | Butcher et al. | |
| 6,245,390 B1 * | 6/2001 | Baranovski ............ | B05B 7/203 219/76.14 |
| 6,405,095 B1 * | 6/2002 | Jang .................... | B22F 1/0003 700/118 |
| 6,526,327 B2 | 2/2003 | Kar et al. | |
| 6,884,959 B2 * | 4/2005 | Gandy .................. | B23K 9/188 219/76.14 |
| 6,940,037 B1 | 9/2005 | Kovacevic et al. | |
| 7,335,854 B2 * | 2/2008 | Hutchison ............. | B23K 9/125 219/137.71 |
| 7,704,565 B2 | 4/2010 | Slaughter | |
| 8,653,409 B1 | 2/2014 | Sodhi | |
| 8,952,292 B2 * | 2/2015 | Behmlander ........ | B23K 9/1735 219/136 |
| 9,011,136 B1 | 4/2015 | Uzan et al. | |
| 9,162,305 B2 | 10/2015 | Brass et al. | |
| 9,174,312 B2 | 11/2015 | Baughman et al. | |
| 9,192,990 B2 | 11/2015 | Meyer et al. | |
| 9,266,181 B2 | 2/2016 | Flagg et al. | |
| 9,352,413 B2 | 5/2016 | Bruck et al. | |
| 9,796,048 B2 * | 10/2017 | Lacy .................. | C22C 33/0285 |
| 9,833,862 B2 | 12/2017 | Denney et al. | |
| 9,884,393 B2 | 2/2018 | Roberts et al. | |
| 9,902,018 B2 * | 2/2018 | Voice .................... | B33Y 30/00 |
| 9,975,179 B2 | 5/2018 | Czinger et al. | |
| 10,543,549 B2 * | 1/2020 | Albrecht .............. | B23K 31/02 |
| 2001/0040153 A1 * | 11/2001 | Lanouette ........... | B23K 9/1006 219/130.21 |
| 2003/0062355 A1 * | 4/2003 | Ikegami ............... | B23K 9/1735 219/137 PS |
| 2003/0068518 A1 * | 4/2003 | Ando ................... | B23K 10/027 428/608 |
| 2004/0107019 A1 | 6/2004 | Keshavmurthy et al. | |
| 2006/0054079 A1 * | 3/2006 | Withey ................. | C30B 29/02 117/108 |
| 2007/0164002 A1 * | 7/2007 | Scandella ............ | B23K 9/048 219/76.14 |
| 2010/0326962 A1 * | 12/2010 | Calla .................. | B23K 9/0956 219/76.14 |
| 2010/0326963 A1 * | 12/2010 | Peters ................... | B23K 9/122 219/76.14 |
| 2011/0168676 A1 * | 7/2011 | Peters ................. | A61B 10/0045 219/73.1 |
| 2012/0018924 A1 * | 1/2012 | Swanson ............... | B29C 64/118 264/401 |
| 2012/0298639 A1 * | 11/2012 | Wang .................. | B23K 9/133 219/121.64 |
| 2012/0305532 A1 * | 12/2012 | Harris .................. | B23K 9/1735 219/76.14 |
| 2012/0325779 A1 | 12/2012 | Yelistratov | |
| 2013/0213942 A1 * | 8/2013 | Peters .................... | B23K 9/121 219/76.1 |
| 2014/0131323 A1 * | 5/2014 | Flagg .................. | B23K 9/184 219/76.14 |
| 2014/0161618 A1 | 6/2014 | Walker et al. | |
| 2014/0299091 A1 | 10/2014 | Ribeiro et al. | |
| 2014/0315040 A1 | 10/2014 | Urban | |
| 2014/0339203 A1 * | 11/2014 | Peters ................. | B23K 9/1735 219/76.14 |
| 2015/0014885 A1 | 1/2015 | Hofmann et al. | |
| 2015/0021379 A1 * | 1/2015 | Albrecht ............... | B05B 7/22 228/256 |
| 2015/0021815 A1 * | 1/2015 | Albrecht ............... | B23K 9/232 264/235 |
| 2015/0044084 A1 | 2/2015 | Hofmann et al. | |
| 2015/0158107 A1 * | 6/2015 | Latessa ................ | B23K 9/125 219/121.63 |
| 2015/0209905 A1 * | 7/2015 | Matthews ............. | B23K 26/32 219/76.14 |
| 2015/0209908 A1 * | 7/2015 | Peters ................. | B23K 26/211 219/76.14 |
| 2015/0209913 A1 * | 7/2015 | Denney ................ | B23K 9/173 219/76.14 |
| 2015/0321295 A1 | 11/2015 | Van Der Mee et al. | |
| 2015/0352770 A1 | 12/2015 | Busenbecker | |
| 2016/0032766 A1 | 2/2016 | Bunker et al. | |
| 2016/0069622 A1 * | 3/2016 | Alexiou ................ | B22F 5/10 165/146 |
| 2016/0251736 A1 | 9/2016 | Shimizu | |
| 2017/0008114 A1 | 1/2017 | Langham et al. | |
| 2017/0050254 A1 * | 2/2017 | Holverson ............ | B23K 9/04 |
| 2017/0066083 A1 | 3/2017 | Shioya et al. | |
| 2017/0203508 A1 * | 7/2017 | Dikovsky ............ | H05K 3/4664 |
| 2017/0209958 A1 | 7/2017 | Soshi | |
| 2017/0298735 A1 | 10/2017 | Walker et al. | |
| 2017/0326690 A1 | 11/2017 | Heard et al. | |
| 2018/0021890 A1 | 1/2018 | Griffith et al. | |
| 2018/0037282 A1 | 2/2018 | Czinger et al. | |
| 2018/0071819 A1 | 3/2018 | Connor et al. | |
| 2018/0085995 A1 | 3/2018 | Davis | |
| 2018/0104759 A1 | 4/2018 | Ma | |

(56) References Cited

U.S. PATENT DOCUMENTS

| | | | | |
|---|---|---|---|---|
| 2019/0160538 A1* | 5/2019 | Blankenship | .......... | B23K 9/042 |
| 2020/0130296 A1* | 4/2020 | Stockett | .................. | B22F 10/30 |

FOREIGN PATENT DOCUMENTS

| | | |
|---|---|---|
| CN | 105172148 A | 12/2015 |
| CN | 106903903 A | 6/2017 |
| DE | 10 2007 056259 A1 | 6/2009 |
| DE | 10 2010 025950 A1 | 1/2012 |
| EP | 2 498 935 A1 | 9/2012 |
| EP | 2 555 902 A1 | 2/2013 |
| EP | 3 213 863 A1 | 9/2017 |
| GB | 1 239 587 A | 7/1971 |
| JP | 2013-248654 A | 12/2013 |
| WO | 2013/112217 A2 | 8/2013 |
| WO | 2016/019434 A1 | 2/2016 |
| WO | 2017/114104 A1 | 7/2017 |

OTHER PUBLICATIONS

Bayode, et al.; "Effect of Scanning Speed on Laser Deposited 17-4PH Stainless Steel;" 8th International Conference on Mechanical and Intelligent Manufacturing Technologies (ICMIMT); IEEE; Dated Feb. 3, 2017; pp. 1-5.
Extended European Search Report from Corresponding Application No. 18209304.7; dated Mar. 14, 2019; pp. 1-15.
Extended European Search Report from Corresponding Application No. 18209097.7; dated Mar. 13, 2019; pp. 1-12.
Cyr, et al.; "Fracture behaviour of additively manufactured MS1-H13 hybrid hard steels;" Materials Letters; Elsevier; vol. 212; Dated Oct. 21, 2017; pp. 174-177.
Baek, et al.; "Mechanical Characteristics of a Tool Steel Layer Deposited by Using Direct Energy Deposition;" Metals and Materials International, Korean Institute of Metals and Materials; vol. 23, No. 4; Dated Jul. 12, 2017; pp. 710-777.
Extended European Search Report from Corresponding Application No. 18209292.4; dated Mar. 18, 2019; pp. 1-15.
Extended European Search Report from Corresponding Application No. 18209284_1; dated May 9, 2019; pp. 1-11.
Optics.org; "LMD takes off for industrial additive manufacturing;" http://optics.org/news/7/11/30; Dated Nov. 17, 2016; pp. 1-3.
Ohnsman, et al.; "How Kevin Czinger shrunk the auto factory;" Forbes India; http://www.forbesindia.com/article/cross-border/how-kevin-czinger-shrunk-the-auto-factory/48939/1; Dated Dec. 21, 2017; Pages.
Flying Machine; "3D Printed Titanium: Bike of the Future;" http://www.flyingmachine.com.au/3d-printed-titanium-bike-of-the-future/; Accessed Jun. 14, 2018; pp. 1-6.
Duann; "3D Printed Structural Furniture Components;" https://www.shapeways.com/blog/archives/616-3d-printed-structural-furniture-components.html; Dated Oct. 18, 2010; pp. 1-6.
Lei, et al.; "Joining of Sip/6063Al composite using additive manufacturing-based laser melting deposition;" Material Letters; vol. 190; Dated Mar. 1, 2017; pp. 191-194.
Yang, et al.; "Rapid fabrication of metallic mechanism joints by selective laser melting;" Proceedings of the Institution of Mechanical Engineers, Part B: Journal of Engineering Manufacture; vol. 225, Issue 12; Dated Oct. 5, 2011; pp. 2249-2256.
Ding; "Laser Deposition Joining of Composites for Wind Turbine Blade Repair;" http://grantome.com/grant/NSF/CMMI-1537512; Accessed Jun. 14, 2018; pp. 1-3.
Relyon Plasma; "Maximum surface quality in 3D printing;" https://www.relyon-plasma.com/maximum-surface-quality-in-3d-printing/?lang=en; Accessed Jun. 19, 2018; pp. 1-6.
Bertschi; "DIY Laser cutter, Plasma cutter and 3D-Printer AllinOne;" https://www.youtube.com/watch?v=ojqlFL6pGWE; Dated Mar. 1, 2016; pp. 1-2.
Adel, et al.; "Enhancing the Surface Roughnessof Fused Deposition Modeling Products;" Journal of Engineering Sciences; vol. 45, No. 3; Dated May 2017; pp. 324-332.
Manogharan, et al.; "AIMS—a Metal Additive-Hybrid Manufacturing System: System Architecture and Attributes;" Procedia Manufacturing; vol. 1, Dated Jun. 2015; pp. 273-286.
Formlabs; "Replacing Machined Jigs and Fixtures With 3D Printed Parts;" https://formlabs.com/blog/replacing-machined-jigs-fixtures-3d-printed-parts/; Accessed Jun. 14, 2018; Dated; pp. 1-12.
DMG Mori; "Complex 3D components with powder nozzle or in the powder bed;" Advanced Technologies; https://in.dmgmori.com/news-and-media/technical-press-news/news/lasertec-65-3d; Dated Jun. 6, 2017; pp. 1-8.
Akuula, "Hybrid adaptive layer manufacturing: An Intelligent art of direct metal rapid tooling process"; Robotics and Computer-Integrated Manufacturing; vol. 22; Published 2006; pp. 113-123.
America Makes; "4062 Multi-Source/Feedstock/Meter-Scale Metal AM Machine"; https://www.americamakes.us/portfolio/4062-multi-sourcefeedstockmeter-scale-metal-machine/; May 17, 2018; pp. 1-3.
Partial European Search Report from Corresponding Application No. 18209270.0-1016; dated May 24, 2019; pp. 1-14.
Extended European Search Report from Corresponding Application No. 18209298.1-1016; dated Jun. 21, 2019; pp. 1-9.

* cited by examiner

METHODS AND SYSTEMS FOR ADDITIVE MANUFACTURING

CROSS-REFERENCE TO RELATED APPLICATIONS

Benefit of U.S. Provisional Patent Application Ser. No. 62/592,045 filed Nov. 29, 2017, is hereby claimed and the disclosure incorporated herein by reference.

FIELD

Embodiments of the present invention relate to systems and methods related to welding, or technology resembling welding (e.g., cladding), and more specifically to additive manufacturing of parts, such as tools for example.

BACKGROUND

Conventionally, additive manufacturing processes are able to make near net shape parts at relatively low deposition rates (e.g., powder: 30-100 $cm^3$/hr; wire: 800-2000 $cm^3$/hr) where each part is built up layer-by-layer. Build times can be long and, occasionally, defects such as lack-of-fusion caused by low heat inputs can be created. Wire-based additive manufacturing processes can have higher deposition rates than powder-based processes; however, powder-based processes can have a higher resolution for more detailed features. Thus, different additive manufacturing processes have advantages and disadvantages that should be considered when manufacturing near net shape parts.

Traditionally, jigs, fixtures, dies, molds, machine tools, cutting tools, gauges, and other tools (generally referred to herein as tools or tooling) are used in various manufacturing processes. Such tooling is typically made to be very hard to perform a particular function (e.g., metal stamping or forging) and tends to have a high carbon content. Tooling is often made of very hard material that is machined from a single piece of wrought material. For example, hard tools are often made by forming a martensitic structure (e.g., martensite) via rapid cooling. A martensitic structure commonly refers to a very hard form of steel crystalline structure, but may also refer to any crystal structure that is formed by diffusionless transformation. In general, martensite is a hard and very brittle solid solution of carbon in iron that is the main component of hardened steel. While hardness of the tooling is often needed to perform a manufacturing function, such hard tooling is prone to cracking because the carbon content is so high. Typically, however, only a fraction of the surface of the tooling experiences high stresses and/or temperatures during use, while the rest of the tooling does not.

SUMMARY

Embodiments of the present invention include processes, compositions, and structures related to additive manufacturing of parts such as tooling. Tooling may be used for stamping, forging, or casting metals via hot or cold processes, for example, or for extruding metals or plastics. Also, tooling may be used for injection of metal, plastic, or glass, for example, in an injection molding process. Furthermore, tooling may be used in processes that use fiberglass or carbon fiber, for example. Such tooling may be required to operate in hot and/or cold environments and be resistant to one or more of impact, wear, deformation, corrosion, thermal shock, and erosion. For example, Invar is a nickel-iron alloy having a low coefficient of thermal expansion. The processes, compositions, and structures described herein for additive manufacturing of tooling are different than traditional non-additive approaches. Manufacturing/fabricating tooling (which contains high levels of carbon) via additive manufacturing is very difficult because of the hard and brittle nature of such deposits. Therefore, making tooling via an additive manufacturing process does not use the same alloy content as traditionally made tooling. For additive tool manufacturing, carbon may be replaced with some other alloy and cooling rates are controlled to provide the strength and other desirable characteristics of the tooling. It is to be appreciated that the embodiments described herein can be applied to form metallic parts other than tooling (e.g., parts of machines or building structural components) and, thus, the present disclosure is not limited to tooling.

In one embodiment, an additive manufacturing system includes an electrode head comprising an array of multiple electrodes for depositing material layer by layer to form a three-dimensional (3D) attachment structure connecting first and second prefabricated metallic parts. The array of multiple electrodes includes a first plurality of electrodes formed from a first metallic material having a first ductility and a first hardness, and a second plurality of electrodes formed from a second metallic material having a second ductility and a second hardness, wherein the first ductility is greater than the second ductility and the second hardness is greater than the first hardness. A power source is configured to provide power for heating each electrode of the array of multiple electrodes. A drive roll system is configured to drive each electrode of the array of multiple electrodes. A controller is operatively connected to the power source and configured to control operations of the additive manufacturing system to form an interior portion of the attachment structure using the first plurality of electrodes, and control the operations of the additive manufacturing system to form an exterior portion of the attachment structure, surrounding the interior portion of the attachment structure, using the second plurality of electrodes, such that ductility of the interior portion of the attachment structure, is greater than ductility of the exterior portion of the attachment structure. In one embodiment, the electrodes of the array of multiple electrodes are consumable welding wires. In one embodiment, the controller is programmed to operate the additive manufacturing system to deposit the material at areas defined by a computer aided design (CAD) model of the attachment structure. In one embodiment, the first and second prefabricated metallic parts are forged metallic parts. In one embodiment, the first and second prefabricated metallic parts are cast metallic parts. In one embodiment, the controller is configured to control the operations of the additive manufacturing system to form a transition portion of the part, extending between the interior portion and the exterior portion, using both of the first plurality of electrodes and the second plurality of electrodes such that the transition portion is an alloy formed from the first metallic material and the second metallic material. In a further embodiment, a proportion of the first metallic material to the second metallic material decreases through the transition portion from the interior portion to the exterior portion.

In one embodiment, an additive manufacturing system includes an electrode head comprising an array of multiple electrodes for depositing material layer by layer to form a three-dimensional (3D) part. The array of multiple electrodes includes a first plurality of electrodes formed from a first metallic material having a first ductility and a first hardness, and a second plurality of electrodes formed from a second metallic material having a second ductility and a second hardness, wherein the first ductility is greater than the second ductility and the second hardness is greater than the first hardness. A power source is configured to provide power for heating each electrode of the array of multiple electrodes. A drive roll system is configured to drive each electrode of the array of multiple electrodes. A controller is operatively connected to the power source and configured to control operations of the additive manufacturing system to form an interior portion of the part using the first plurality of electrodes, and control the operations of the additive manufacturing system to form an exterior portion of the part, surrounding the interior portion of the part, using the second plurality of electrodes, such that ductility of the interior portion of the part, is greater than ductility of the exterior portion of the part. The controller is programmed to operate the additive manufacturing system to deposit the material at areas defined by a computer aided design (CAD) model of the part, and the computer aided design (CAD) model defines an attachment structure for the part that physically corresponds to a postprocessing fixture for holding the part during postprocessing machining of the part. In one embodiment, the electrodes of the array of multiple electrodes are consumable welding wires. In one embodiment, the attachment structure is shaped to align the part in the postprocessing fixture based on the postprocessing machining to be performed. In one embodiment, the controller is configured to control the operations of the additive manufacturing system to form a transition portion of the part, extending between the interior portion and the exterior portion, using both of the first plurality of electrodes and the second plurality of electrodes such that the transition portion is an alloy formed from the first metallic material and the second metallic material. In a further embodiment, a proportion of the first metallic material to the second metallic material decreases through the transition portion from the interior portion to the exterior portion.

One embodiment includes a method of additively manufacturing a part to limit crack propagation through the part. The method includes providing an additive manufacturing system comprising an electrode head comprising an array of multiple electrodes for depositing material layer by layer to form the part, wherein the array of multiple electrodes includes a first plurality of electrodes formed from a first metallic material having a first ductility and a first hardness, and a second plurality of electrodes formed from a second metallic material having a second ductility and a second hardness, wherein the first ductility is greater than the second ductility and the second hardness is greater than the first hardness, a power source configured to provide electrical power for establishing an electric arc for each electrode of the array of multiple electrodes, a drive roll system configured to drive each electrode of the array of multiple electrodes, and a controller operatively connected to the power source. The method further includes additively manufacturing the part from at least the first plurality of electrodes and the second plurality of electrodes, including forming an interior portion of the part using the first plurality of electrodes, forming an exterior portion of the part, surrounding the interior portion of the part, using the second plurality of electrodes, wherein ductility of the interior portion of the part is greater than ductility of the exterior portion of the part. The method further includes removing a portion of the part by plasma cutting the part to form a cut surface of the part, wherein the cut surface has a lower average roughness than said exterior portion. In one embodiment, the method includes forming a transition portion of the part, extending between the interior portion and the exterior portion, using both of the first plurality of electrodes and the second plurality of electrodes such that the transition portion is an alloy formed from the first metallic material and the second metallic material. In a further embodiment, a proportion of the first metallic material to the second metallic material decreases through the transition portion from the interior portion to the exterior portion. In a further embodiment, the step of forming a transition portion includes adjusting active numbers of electrodes of both of the first plurality of electrodes and the second plurality of electrodes during additive manufacturing, to adjust said proportion from the interior portion to the exterior portion. In one embodiment, the controller is programmed to operate the additive manufacturing system to deposit the material at areas defined by a computer aided design (CAD) model of the part. In one embodiment, the part includes an attachment structure that physically corresponds to a postprocessing fixture for holding the part during postprocessing machining of the part. In one embodiment, the part is a cutting tooth of a fragmenting machine. In one embodiment, the part is an attachment structure extending between first and second prefabricated metallic parts, and the first and second prefabricated metallic parts are forged or cast metallic parts.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Embodiments of additive manufacturing systems and methods are disclosed. Multiple metallic materials are combined and utilized in the creation of near net shape parts, such as tools, components of tools, joints or unions between metallic components, or attachment features for parts, to exploit the advantages provided by the different materials or processes. Example additive manufacturing processes that may be employed in the manufacture of near net shape parts include powder processes, wire processes, laser hot wire processes and thermal spray processes. Such processes can be combined in a single additive manufacturing system. By combining high deposition rate and low resolution processes (e.g., wire based) with lower deposition rate but higher resolution processes (e.g., powder based), large parts can be made quickly but also contain finely detailed interior and exterior features which would otherwise require extensive secondary processing. The use of multiple metallic materials in the manufacturing of a part can allow different portions of the part to have different properties, such as ductility or hardness for example, and can allow for the use of inexpensive materials where appropriate.

Figure 1:
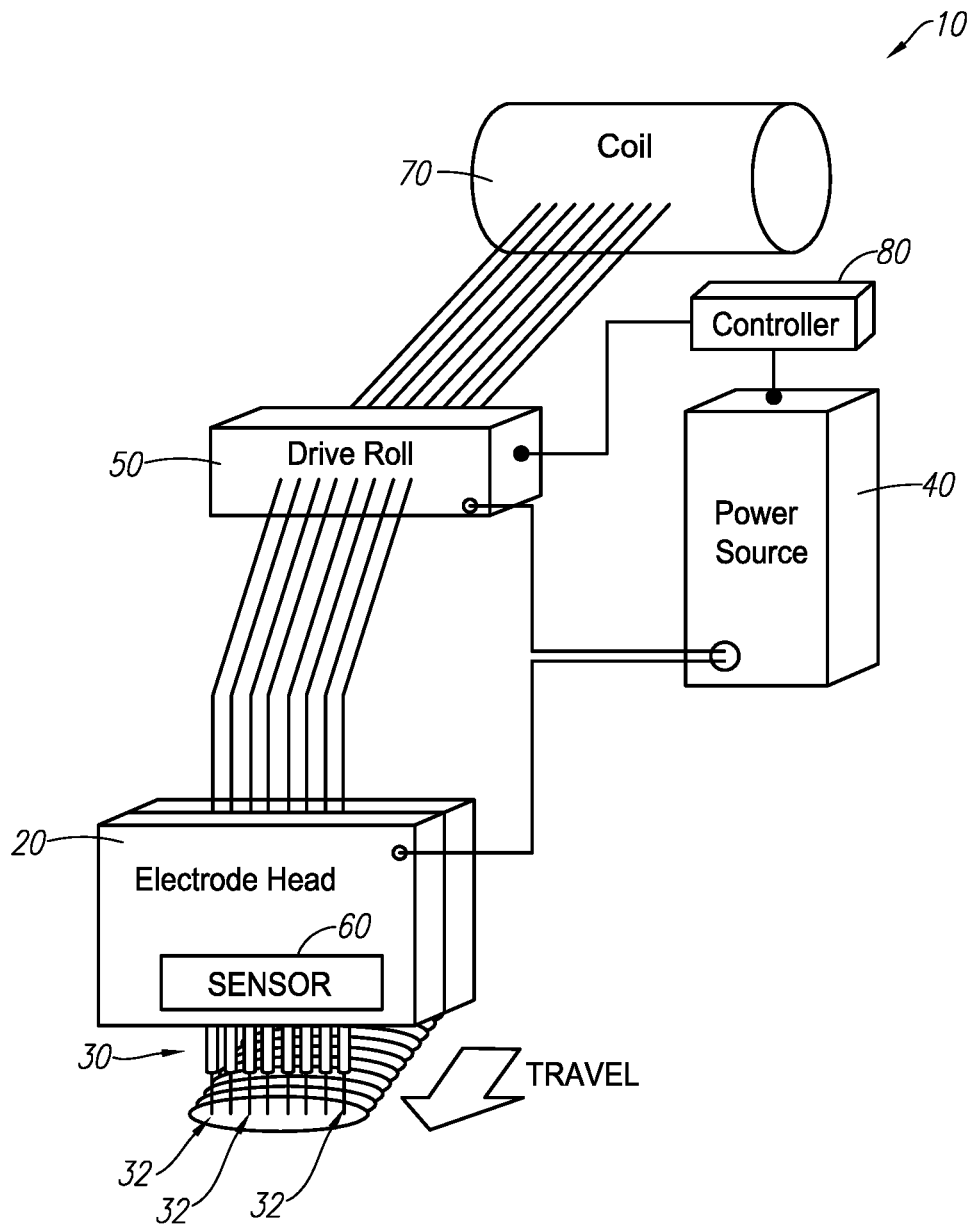
FIG. 1 illustrates an embodiment of a multi-electrode additive manufacturing subsystem.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 illustrates an embodiment of an example additive manufacturing system, depicted generally at 10, that can be part of a multiple process additive manufacturing system or a stand-alone system. It is envisioned that system 10 may typically be used to additively manufacture a part, layer-by-layer, by a welding process, such as submerged arc or electroslag welding, gas metal arc welding (GMAW), flux-cored arc welding (FCAW), and gas tungsten arc welding (GTAW).

As illustrated in FIG. 1, additive manufacturing system 10 includes an electrode head 20, wherein the electrode head 20 concurrently houses an array 30 of multiple electrodes 32 (e.g. consumable welding electrodes/wires). It is to be appreciated that the multiple electrodes 32 can be continuously fed, periodically fed, or fed based on a predetermined order. The electrodes 32 may be gas-shielded, self-shielded, or metal core or flux cored wires, to be used under gas shielding. In the instance of cored electrodes, it is contemplated that the electrode sheath may be carbon steel, stainless steel, or a nickel alloy. The electrode head 20 houses the array 30 such that electrodes 32 are in a spaced apart configuration for controllably depositing material to form a layer of a 3D part (e.g., by initially depositing material on a surface of an associated workpiece). It is to be appreciated and understood that the electrode head 20 can be any suitable electrode head that houses the array 30 to deliver the electrodes 32 and the subject innovation is not to be limited by the electrode head illustrated herein. For example, the electrode head 20 can be an assembly that utilizes individual contact tips for the array 30 or a contact assembly that universally houses and encases the electrode array 30. The electrodes 32 may be provided from a coil 70. The coil 70 may include a plurality of individual coils, each coil containing a single electrode (e.g., a welding wire), which are arranged along a common axis of rotation. Still any manner of delivering filler wire or additive material may be chosen without departing from the intended scope of coverage of the embodiments of the subject disclosure. For example, in one embodiment, the electrode head 20 is configured to provide a single consumable metal wire instead of an array of wires.

As illustrated in FIG. 1, electrode head 20 is adapted to receive the array 30 of associated multiple fed electrodes 32. The system 10 includes means for driving the array 30 of electrodes 32 through the electrode head 20. It is envisioned that the means for driving includes a plurality of drive rolls or a drive roll system 50 or other wire feeder device. Each of the plurality of drive rolls 50 may be associated with one or more of the electrodes 32. In one aspect, two electrodes 32 may be associated with a single set of drive rolls 50, although it is envisioned that the relationship between the number of electrodes and the number of wire feeders may be configured such that any number of electrodes may be associated with a single set of drive rolls as appropriate in an additive manufacturing process without departing from the intent of the subject disclosure. In another embodiment, each electrode can be driven by a respective drive roll 50. In another embodiment, the electrode(s) can be driven by drive roll 50 based on a predetermined order or a second predetermined order to which welding arcs are established with one or more electrodes. In other words, if a predetermined order establishes a welding arc between a first electrode, then a second and third electrode, a first drive roll 50 can drive the first electrode and a second drive roll 50 can drive the second and third electrode. Still, other relationships between drive roll 50 and one or more electrodes may be employed with sound engineering judgment.

In one example embodiment, the drive rolls 50 may be configured to drive the electrodes 32 through the electrode head 20 at a rate (e.g., a wire feed speed). In one embodiment, the electrodes 32 can be driven at substantially the same rate. In another embodiment, each electrode 32 can be driven at a respective rate that can be predetermined or dynamically identified during an additive manufacturing procedure. For instance, a rate (e.g., a wire feed speed) for one or more electrodes 32 can be predetermined based on material composition, type of weld, welding parameters, workpiece, among others. In another embodiment, a rate for one or more electrodes can be dynamically identified during the additive manufacturing process based upon criteria such as, but not limited to, user input, feedback, voltage, current, and temperature, among others.

Alternatively, the drive rolls 50 are configured to feed the electrodes 32 at slower and/or faster wire speeds/wire feed rates, where it may be desired to change the current needed to melt off the electrode, thereby changing the heat input by the electrode 32 into the molten layer material. For example, one set of drive rolls 50 may be configured to feed the electrodes 32 arranged at the outside of the array 30 at one wire feed speed, while a different set of drive rolls 50 may be configured to feed the electrodes 32 arranged at the inside of the array 30 at a relatively lower wire feed speed as compared to the wire feed speed of the outer electrodes.

It is to be appreciated that a drive roll 50 can be used to drive one or more electrodes based on a predetermined speed. For instance, each drive roll 50 can be used to drive a respective electrode 32 in the array 30, wherein each electrode is driven at a specific and particular wire feed speed. For instance, the wire feed speed for each electrode 32 can vary based upon, but not limited to, wire type, part material composition, environment (e.g., air temperature, humidity, and the like), wire gauge, electrode type, voltage, current, welding device used to perform the additive manufacturing operation, among others.

In one aspect of the embodiments of the subject invention, each of the electrodes 32 is configured to be connected to welding power source 40. That is to say that during the additive manufacturing process, for instance, welding power can be delivered through each of the electrodes 32 in the array 30. Accordingly, additive material is delivered over a width of the electrode head 20. As indicated above, power may be delivered from the welding power source 40 through welding cables as attached at one end to studs (not shown). At the distal end, welding cables may be connected to the electrode head 20 through an electrode head connector. In the exemplary case of a single welding power source 40, a single electrode head connector may convey power from the welding cables commonly to the electrode head 20. Still, other means for conveying power from the welding cables to the electrode head 20 may be employed with sound engineering judgment.

Figure 2:
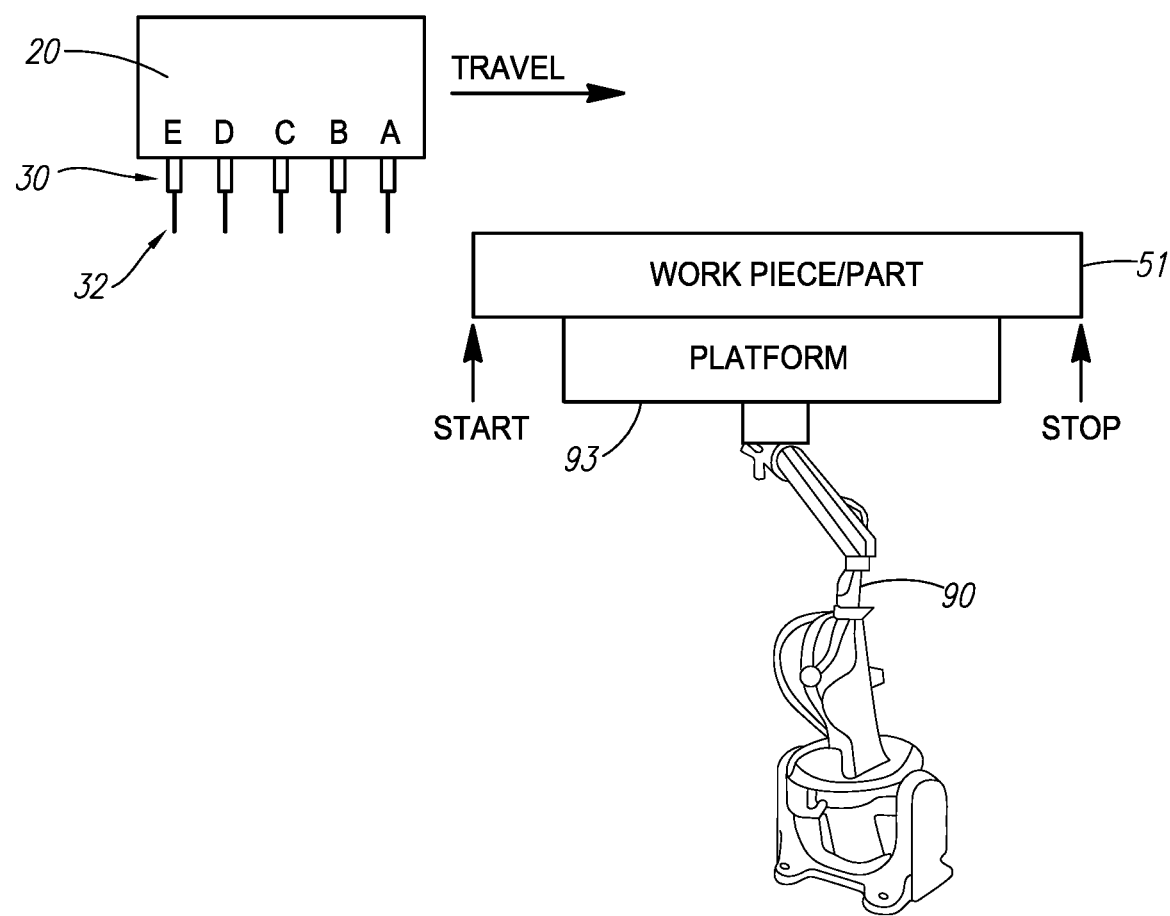
FIG. 2 illustrates an embodiment of an electrode head having multiple electrodes in an array that are configured to deposit material onto a workpiece in a direction of travel.

The power source 40 supplies electrical power for establishing a welding arc between each of the associated multiple fed electrodes and the associated workpiece or part 51 to additively manufacture a part (see FIG. 2). In particular, one or more power sources 40 can supply power to one or more electrodes 32 of the array 30 based on a predetermined order. For instance, the predetermined order can be based on a location of the electrode head 20 on the workpiece or part 51. In another instance, the predetermined order can be based on a starting of a motion of the electrode head 20 to begin an additive manufacturing process. In another embodiment, one or more power sources 40 terminate the welding arc between each of the associated multiple fed electrodes and the associated workpiece or part 51. In such an embodiment, the one or more power sources 40 can terminate the welding arc for one or more of the electrodes 32 of the array 30 with a second predetermined order. For instance, the second predetermined order can be based on a location of the electrode head 20 on the workpiece or part 51. In another example, the second predetermined order can be based on a stopping of a motion of the electrode head 20 to end an additive manufacturing process.

Furthermore, an establishment of a welding arc between an electrode 32 and the workpiece or part 51 can be provided by at least one of the power source 40 (e.g., supplying power, not supplying power, terminating power supply, and the like) or drive roll(s) 50 (e.g., driving electrode(s), not driving electrode(s), terminating drive of electrode, and the like). Thus, the electrodes 32 in the array 30 can be activated or deactivated based on a predetermined order, wherein the activation and/or deactivation can be based on the power source 40 and/or drive roll(s) 50. In one embodiment, controlled establishment of welding arcs to the electrodes 32 and/or controlled drive to the electrodes 32 is provided for additive manufacturing processes. As such, individual electrodes can be effectively "turned on" or "turned off" to enable the creation of contoured 2D shapes within a layer of the 3D part.

In a particular embodiment, a sensor 60 is configured to detect at least one of a location of the electrode head 20 on the workpiece or part 51, an alignment of at least one electrode 32 of the array 30 compared to the workpiece or part 51, or a nonalignment of at least one electrode 32 of the array 30 compared to the workpiece or part 51. The sensor 60 can be coupled or affixed to the electrode head 20 at a location in order to detect a location of at least one electrode 32 in reference to the workpiece or part 51. For instance, the sensor 60 is situated on the electrode head 20 in a horizontal manner, yet it is to be appreciated that any suitable orientation can be employed. In another embodiment, a plurality of sensors 60 can be used. For example, a sensor can be used for each electrode 32. In such an example, the sensor 60 for each electrode 32 can be oriented vertically in line with the respective electrode 32. By way of example and not limitation, the sensor 60 can be an infrared (IR) sensor or a proximity sensor, among others. The sensor 60 detects alignment and/or nonalignment of at least one electrode 32 with respect to at least a portion of the workpiece or part 51. In particular, the sensor 60 detects whether an electrode 32 is in contact and/or not in contact with a portion of the workpiece or part 51 to establish a welding arc. In another example, the sensor 51 can detect whether a current and/or voltage flow is established through the power source 40 and the workpiece or part 51. It is to be appreciated that an alignment of one or more electrodes 32 refers to a contact that allows a welding arc to establish between the workpiece or part 51 and the electrode 32. Moreover, it is to be appreciated that a nonalignment of one or more electrodes 32 refers to a noncontact that does not allow a welding arc to establish between the workpiece or part 51 and electrode 32.

In accordance with one embodiment, the system 10 includes a controller 80 which controls the power source 40, the drive roll 50, and the electrode head 20. For example, the controller 80 controls the operating characteristics (output voltage, output current, output waveform, etc.) of the electrical power of the power source 40. The controller 80 also controls the operating characteristics of the drive roll 50 (e.g., wire feed speed and arc establishment for each electrode 32 in the array 30). Furthermore, the controller 80 controls the operating characteristics of the electrode head 20 (e.g., position, travel speed, etc.). In accordance with one embodiment, the controller 80 may be integrated into the power source 40. Patterns of multiple layers of a 3D part to be additively manufactured are represented and stored as digital data within the controller 80, in accordance with one embodiment. The controller 80 can be programmed to operate the additive manufacturing system to deposit material at areas defined by a computer aided design (CAD) model of the part.

Referring to FIG. 2 the electrode head 20, having five (5) electrodes 32 in the array 30, can deposit material onto the substrate or part 51 in a controlled direction of travel. A platform 93 and a robot 90 may be used in an additive manufacturing system to rotate and/or translate the substrate or part 51, as controlled by the controller 80, in accordance with one embodiment. In an alternative embodiment, motion of the electrode head 20 may be similarly controlled by the controller 80 to rotate and/or translate the electrode head 20.

In an embodiment, some electrodes 32 in the array 30 have different compositions than other electrodes in the array, allowing for control of the deposition of multiple materials within a layer at various locations and/or to control of a mixing action of materials within a deposited layer. For example, one or more electrodes 32 could be carbon steel and one or more electrodes could be stainless steel, or another metal as desired. The additive manufacturing subsystem 10 including electrodes 32 of varying composition can allow for the manufacturing of near net shape parts from multiple materials (examples of such parts are discussed below). The compositions of the electrodes 32 can be grouped in any manner deemed appropriate for the additive manufacturing process to be performed. For example, electrodes 32 of given compositions can be grouped together adjacent one another. With respect to FIG. 2, electrodes A and B could be one composition, and electrodes C-E could be another composition. The composition of the electrodes 32 can alternate along the electrode head 20 to facilitate mixing of the different metals. For example, electrodes A, C and E could be one composition, and electrodes B and D could be another composition. Other groupings and the use of additional electrodes of varying compositions could be employed in a multiwire additive manufacturing subsystem.

In one example embodiment, some of the electrodes 32 (e.g., a first plurality of electrodes) in the array 30 are made of an expensive alloy or metal as compared to the other electrodes (e.g., a second plurality of electrodes). The inexpensive electrodes can be used to form a portion of the manufactured part. The electrodes 32 made from the expensive alloy can be used to form the other portions of the manufactured part. For example, the expensive alloy can be used to apply an outer coating to the part. Using inexpensive electrodes where possible will serve to reduce the overall cost of the part. The controller 80 is operatively connected to the power source 40 to control operations of the additive manufacturing system to form the portions of the part using the appropriate electrodes 32.

In another example embodiment, some of the electrodes 32 in the array 30 are made of a more ductile or lower hardness material (e.g., low carbon steel) as compared to the other electrodes, which may be formed from a harder and less ductile material (e.g., alloy or high carbon steel) to improve the hardness of the manufactured part. The more ductile material can be used to form the inner portion of the part, and the hard material can be applied as an outer coating. Hardness of the part is often needed to perform a manufacturing function, such as cutting or grinding. However, such hard parts (e.g., tooling) may be prone to cracking because the carbon content is so high. Using a more ductile material inside of the harder material can reduce the propagation of cracks through the part.

Figure 7:
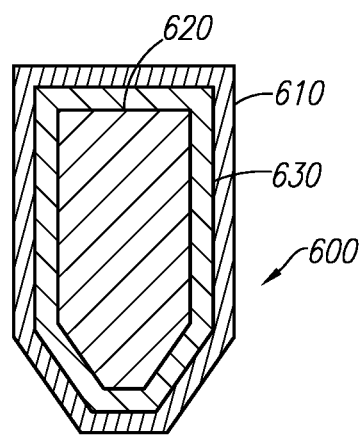
FIG. 7 illustrates an example additively manufactured part.

The mixing of the different materials forming the electrodes 32 can be controlled to provide a desired transition from one metal to another. An abrupt transition from one portion or layer formed from a given material to another portion or layer formed from a different material can result in steep gradients in properties, such as the coefficient of thermal expansion. To reduce the incidence of defects, a slow transition from one material to another can be achieved by depositing layers containing both materials and allowing them to mix. The proportion of one material to the other can be gradually adjusted by activating/deactivating electrodes 32 accordingly, until only the subsequent material is being applied to form the tool. For example, a base of high carbon steel can be slowly transitioned to a stainless steel outer coating. This can be done by activating an increasing number of stainless steel electrodes, and deactivating an increasing number of high carbon steel electrodes, as a cross-section of the tool (e.g., from base to coating) transitions from high carbon to stainless steel. Slowly transitioning from high carbon steel to stainless steel can help to reduce stresses in the manufactured tool due to thermal expansion. FIG. 7 schematically shows an example cross-section of an additively manufactured part 600 formed from different metals provided by the array of electrodes. The exterior portion 610 of the part 600 is formed from a different metallic composition than the interior portion 620. In certain embodiment, the exterior portion 610 can be considered a coating and can have a much thinner cross-section than the interior portion 620. The part 600 also includes a transition portion 630 extending between the interior portion 620 and the exterior portion 610. The transition portion 630 can be formed by blending the metallic material from the different electrodes in the array, to form an alloy (e.g., formed from first and second metallic materials). The transition portion 630 could have a consistent composition across its cross-section, or provide a slow transition from one material to another. For example, a proportion of a first metallic material forming the interior portion 620 to a second metallic material forming the exterior portion 610 can decrease through the transition portion 630 from the interior portion to the exterior portion.

Any number of different electrodes 32 formed from different materials can be used in the additive manufacturing system 10 described above, and the system need not be limited to electrodes 32 formed from two different materials, but could include more than two different types of electrodes.

Figure 3:
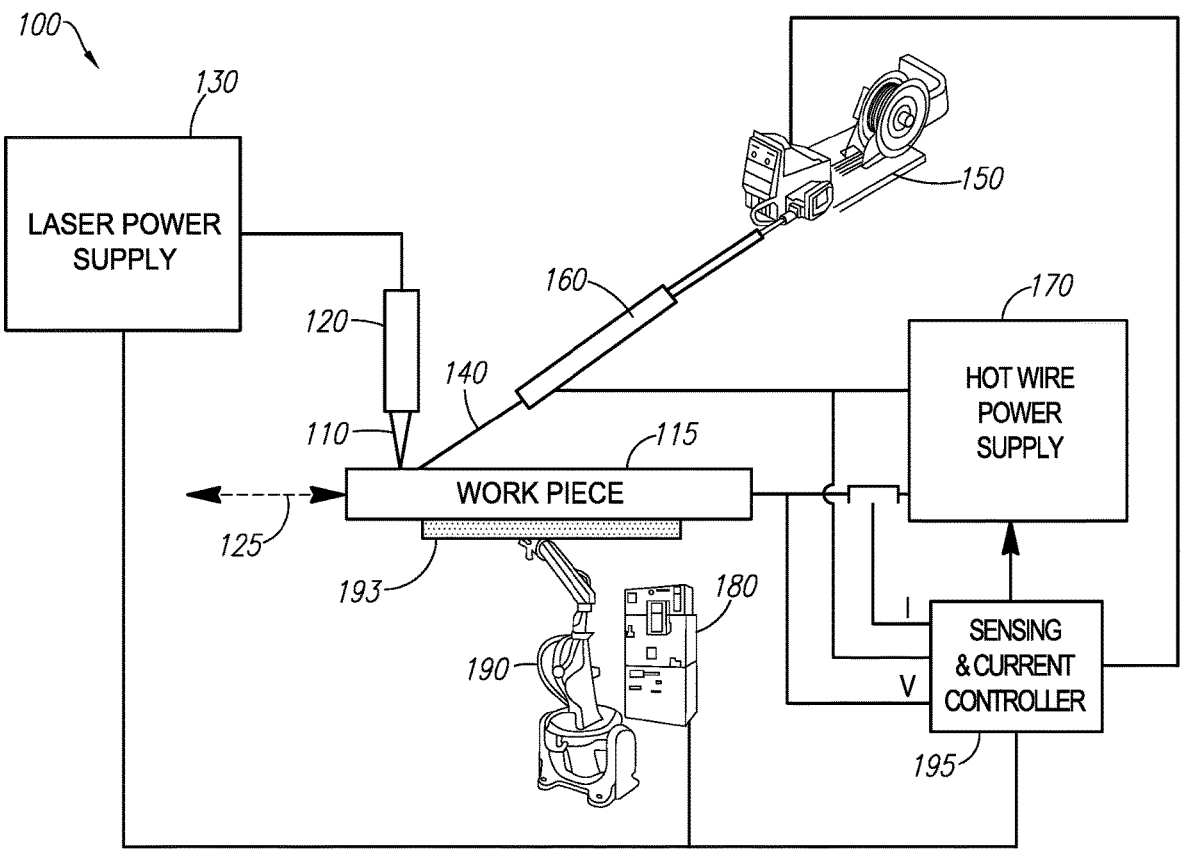
FIG. 3 illustrates an embodiment of a laser hot wire (LHW) additive manufacturing subsystem.

FIG. 3 illustrates a functional schematic block diagram of an exemplary embodiment of a combination filler wire feeder and energy source system 100 for performing additive manufacturing. In one embodiment, FIG. 3 illustrates an embodiment of a laser hot wire (LHW) additive manufacturing system. The laser hot wire additive manufacturing system can be used in conjunction with the multiwire system described above, to manufacture a part. The system 100 includes a laser subsystem capable of focusing a laser beam 110 onto a workpiece or part 115 to heat the workpiece or part 115. The laser subsystem is a high intensity energy source. The laser subsystem can be any type of high energy laser source, including but not limited to carbon dioxide, Nd:YAG, Yb-disk, YB-fiber, fiber delivered, or direct diode laser systems. Other embodiments of the system may include at least one of an electron beam, a plasma arc welding subsystem, a gas tungsten arc welding subsystem, a gas metal arc welding subsystem, a flux cored arc welding subsystem, or a submerged arc welding subsystem serving as the high intensity energy source. In accordance with another embodiment, a portion of the elements of the system 100 may be configured as a blown powder system.

The following will repeatedly refer to the laser system, the beam, and the power supply. However, it should be understood that this reference is exemplary, as any high intensity energy source may be used. For example, a high intensity energy source can provide at least 500 W/cm$^2$. The laser subsystem includes a laser device 120 and a laser power supply 130 operatively connected to each other. The laser power supply 130 provides power to operate the laser device 120.

The additive manufacturing system 100 also includes a hot filler wire feeder subsystem capable of providing at least one resistive filler wire 140 to make contact with the workpiece or part 115 in the vicinity of the laser beam 110. Of course, it is understood that by reference to the workpiece or part 115 herein, the molten puddle is considered part of the workpiece or part 115, thus reference to contact with the workpiece or part 115 includes contact with the puddle. The wire feeder subsystem includes a filler wire feeder 150, a contact tube 160, and a power supply 170. During operation, the filler wire 140 is resistance-heated by electrical current from the power supply 170 which is operatively connected between the contact tube 160 and the workpiece or part 115. In accordance with one embodiment, the power supply 170 is a pulsed direct current (DC) power supply, although alternating current (AC) or other types of power supplies are possible as well. The wire 140 is fed from the filler wire feeder 150 through the contact tube 160 toward the workpiece or part 115 and extends beyond the tube 160. The extension portion of the wire 140 is resistance-heated such that the extension portion approaches or reaches the melting point before contacting a puddle on the workpiece or part. The laser beam 110 serves to melt some of the base metal of the workpiece or part 115 to form a puddle and can also be used to melt the wire 140 onto the workpiece or part 115. The power supply 170 provides energy needed to resistance-melt the filler wire 140. In some embodiments the power supply 170 provides all of the energy needed while in other embodiments the laser or other high energy heat source can provide some of the energy. The feeder subsystem may be capable of simultaneously providing one or more wires, in accordance with certain other embodiments of the present invention.

The system 100 further includes a motion control subsystem capable of moving the laser beam 110 (energy source) and the resistive filler wire 140 in a same direction 125 along the workpiece or part 115 (at least in a relative sense) such that the laser beam 110 and the resistive filler wire 140 remain in a fixed relation to each other. According to various embodiments, the relative motion between the workpiece or part 115 and the laser/wire combination may be achieved by actually moving the workpiece or part 115 or by moving the laser device 120 and the wire feeder subsystem. In FIG. 3, the motion control subsystem includes a motion controller 180 operatively connected to a robot 190 having a platform 193 (e.g., a rotatable platform and/or a translatable platform). The motion controller 180 controls the motion of the robot 190. The robot 190 is operatively connected (e.g., mechanically secured) to the workpiece or part 115 via the platform 193 to move the workpiece or part 115 in the direction 125 such that the laser beam 110 and the wire 140 effectively travel along the workpiece or part 115. In accordance with an alternative embodiment of the present invention, the laser device 110 and the contact tube 160 may be integrated into a single head. The head may be moved along the workpiece or part 115 via a motion control subsystem operatively connected to the head.

In general, there are several methods in which a high intensity energy source/wire may be moved relative to a workpiece or part. If the workpiece or part is round, for example, the high intensity energy source/wire may be stationary and the workpiece or part may be rotated under the high intensity energy source/wire. Alternatively, a robot arm or linear tractor may move parallel to the round workpiece or part and, as the workpiece or part is rotated, the high intensity energy source/wire may move continuously or index once per revolution to, for example, overlay the surface of the round workpiece or part. If the workpiece or part is flat or at least not round, the workpiece or part may be moved under the high intensity energy source/wire as shown in FIG. 3. However, a robot arm or linear tractor or even a beam-mounted carriage may be used to move a high intensity energy source/wire head relative to the workpiece or part. The robot 190 driving the platform 193 may be driven electrically, pneumatically, or hydraulically, in accordance with various embodiments.

The additive manufacturing subsystem 100 further includes a sensing and current control subsystem 195 which is operatively connected to the workpiece or part 115 and the contact tube 160 (i.e., effectively connected to the output of the power supply 170) and is capable of measuring a potential difference (i.e., a voltage V) between and a current (I) through the workpiece or part 115 and the wire 140. The sensing and current control subsystem 195 may further be capable of calculating a resistance value (R=V/I) and/or a power value (P=V*I) from the measured voltage and current. In general, when the wire 140 is in contact with the workpiece or part 115, the potential difference between the wire 140 and the workpiece or part 115 is zero volts or very nearly zero volts. As a result, the sensing and current control subsystem 195 is capable of sensing when the resistive filler wire 140 is in contact with the workpiece or part 115 and is operatively connected to the power supply 170 to be further capable of controlling the flow of current through the resistive filler wire 140 in response to the sensing. In accordance with another embodiment, the sensing and current controller 195 may be an integral part of the power supply 170.

In accordance with one embodiment, the motion controller 180 may further be operatively connected to the laser power supply 130 and/or the sensing and current controller 195. In this manner, the motion controller 180 and the laser power supply 130 may communicate with each other such that the laser power supply 130 knows when the workpiece or part 115 is moving and such that the motion controller 180 knows if the laser device 120 is active. Similarly, in this manner, the motion controller 180 and the sensing and current controller 195 may communicate with each other such that the sensing and current controller 195 knows when the workpiece or part 115 is moving and such that the motion controller 180 knows if the filler wire feeder subsystem is active. Such communications may be used to coordinate activities between the various subsystems of the additive manufacturing system 100.

Figure 4:
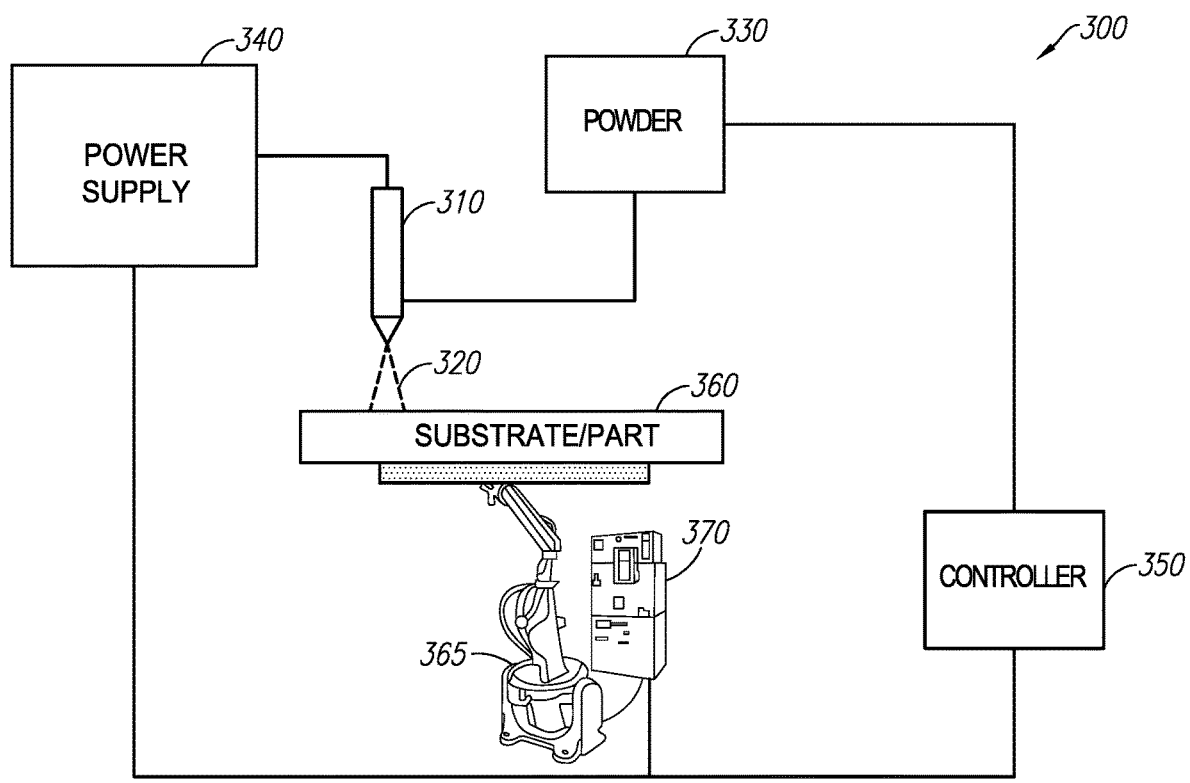
FIG. 4 illustrates an embodiment of a plasma or thermal spray additive manufacturing subsystem.

FIG. 4 illustrates a schematic block diagram of an exemplary embodiment of a plasma or thermal spray system 300 for performing additive manufacturing. The plasma or thermal spray subsystem 300 can be used in conjunction with the multiwire or the laser hot wire systems described above, to manufacture a part. The plasma or thermal spray system 300 includes a plasma torch 310 that creates a plasma jet 320 to melt and deposit a feedstock (e.g., metallic powder 330) to coat a substrate. In the manufacturing of machine tools or other parts, a thermal spray process can be used to coat the part with a hardened surface for example. The plasma or thermal spray system 300 further includes a power supply 340 to power the plasma torch 310, and a controller 350 to control the operations of the plasma or thermal spray subsystem. The plasma or thermal spray system 300 can further include a motion control subsystem similar to that discussed above with respect to a laser hot wire additive manufacturing system. For example, the plasma or thermal spray system 300 can control relative motion between the substrate 360 and plasma torch 310 using a robot 365 and associated motion controller 370. The robot 365 is shown schematically as being attached to the substrate 360 to move the substrate relative to the plasma torch 310. However, the robot 365 could be connected to the plasma torch 310 to move the torch relative to the substrate 360. Plasma or thermal spraying additive manufacturing devices are known in the art and need not be described in detail.

Figure 5:
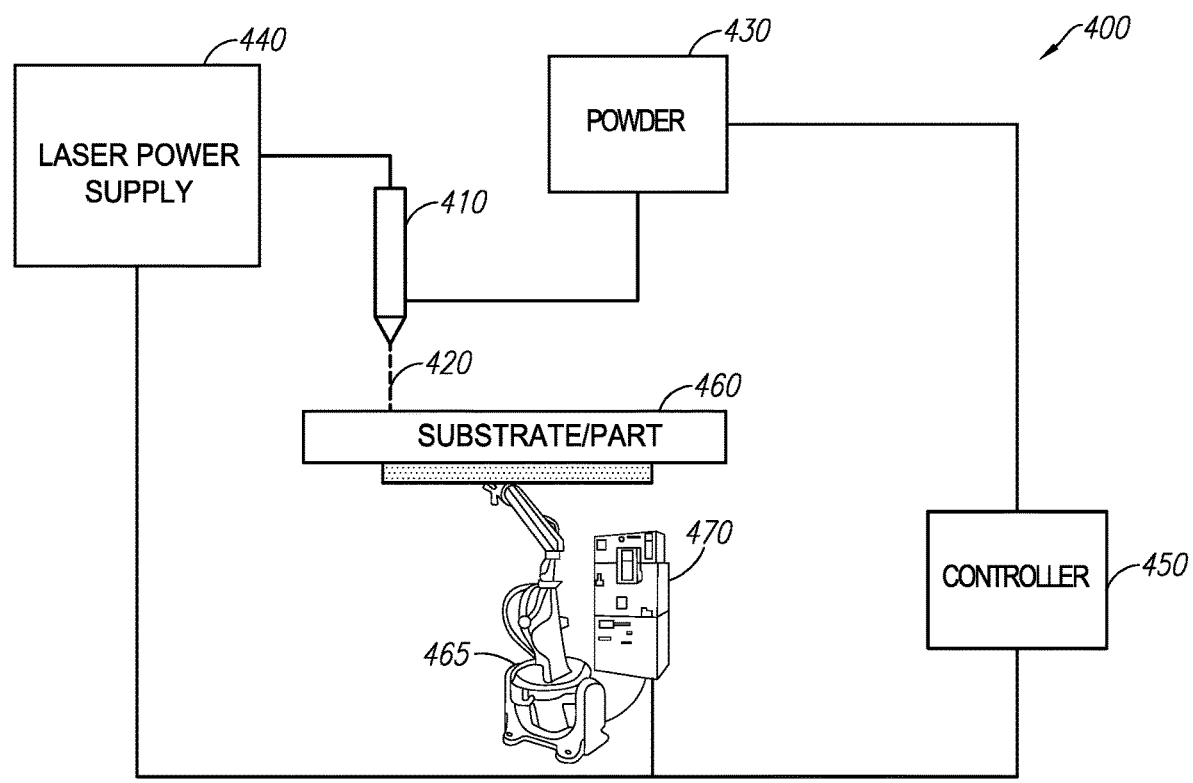
FIG. 5 illustrates and embodiment of a blown powder laser additive manufacturing subsystem.

FIG. 5 illustrates a schematic block diagram of an exemplary embodiment of a blown powder laser system 400 for performing additive manufacturing using a laser beam and coaxial powder flow. The blown powder laser system 400 can be used in conjunction with the multiwire system, the laser hot wire system, and/or the plasma or thermal spray system described above, to manufacture a metallic part. The blown powder laser system 400 includes a laser device 410 that directs a laser beam 420 toward a substrate 460, coaxial with a supply of powdered metal 430 to sinter the metallic material and coat the substrate. The blown powder laser subsystem 400 can be used to coat manufactured tools or other parts (e.g., with a hard exterior surface), or build parts layer by layer. The blown powder laser system 400 further includes a laser power supply 440 connected to the laser device 410, and a controller 450 to control the operations of the blown powder laser system. The blown powder laser system 400 can further include a motion control subsystem similar to that discussed above with respect to a laser hot wire additive manufacturing system. For example, the blown powder laser system 400 can control relative motion between the substrate 460 and laser device 410 using a robot 465 and associated motion controller 470. The robot 465 is shown schematically as being attached to the substrate 460 to move the substrate relative to the laser device 410. However, the robot 465 could be connected to the laser device 410 to move the laser device relative to the substrate 410. Blown powder laser additive manufacturing devices are known in the art and need not be described in detail.

Various example additive manufacturing processes (wire processes, thermal spray processes, powder processes) have been described above for use in the manufacturing of metallic components. These processes have advantages and disadvantages, but can be used together in a single system during the manufacturing process to maximize the advantages that they provide. For example, some portions of a part may be quickly built up using a higher speed, lower resolution process, such as a multiwire process depicted in FIG. 1 or the laser hot wire process depicted in FIG. 3. Other portions having fine details might benefit from a lower speed, higher resolution process, such as the blown powder process depicted in FIG. 5. Still other portions, such as an exterior surface of the machine tool, might benefit from a thermal spray coating (FIG. 4). In a multiprocess system, different portions of an additively manufactured part can be produced using appropriate additive manufacturing systems to improve the manufacturing speed and/or reduce the overall cost of the tool. By combining higher deposition rate and lower resolution processes with lower deposition rate but higher resolution processes, large parts can be made quickly but also contain finely detailed interior and exterior features which would otherwise require extensive secondary postprocessing (e.g., machining).

Multiprocess additive manufacturing also enables the use of multiple different materials in a structure that would otherwise not necessarily be possible or readily producible. Some materials are only commercially available in either a powder or wire form. Thus, a multiprocess system can allow such materials to be included in a common part. Other materials may benefit from deposition with one process over another process. For example, a laser hot wire using cored wires containing carbides will deposit differently than an arc-based process. Thus, the appropriate additive manufacturing process can be chosen for a desired material based on its deposition characteristics.

Figure 6:
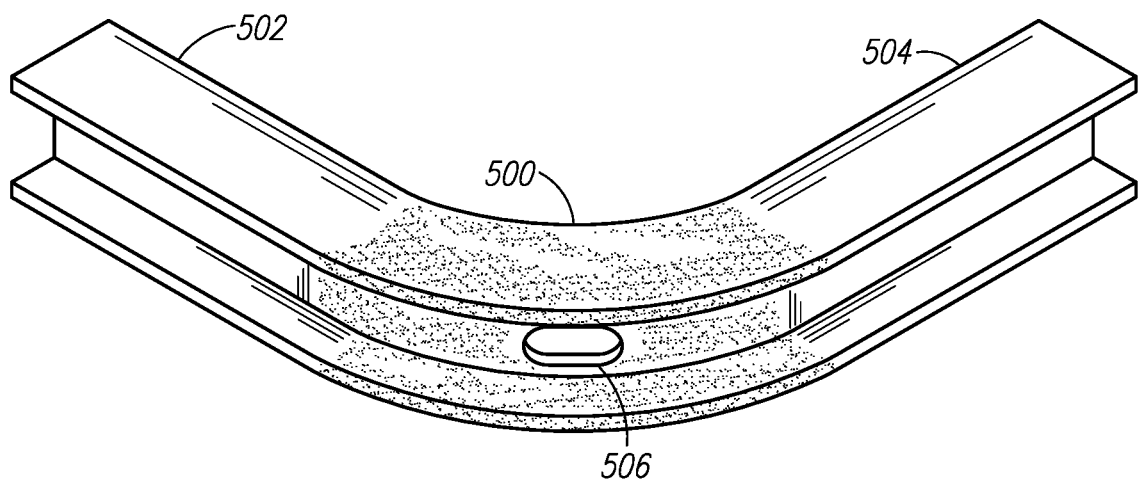
FIG. 6 illustrates an example additively manufactured part.

FIG. 6 shows an example part 500 that can be manufactured using one or more of the additive manufacturing systems described above. The part 500 is a three-dimensional attachment structure (e.g., a joint or union) that is additively manufactured to join together two or more prefabricated metallic parts 502, 504. The prefabricated metallic parts can be additively manufactured themselves, or conventionally manufactured (e.g., fabricated, cast, forged, etc.) The attachment structure 500 can create a blended union between the prefabricated parts 502, 504 having features, such as internal cavities or an overall shape, that are difficult or impossible to produce using conventional (e.g., subtractive) manufacturing processes. The attachment structure 500 forms a further structural component of the overall device or construction (e.g., a third part), in addition to attaching the prefabricated parts 502, 504 to each other. Thus, the attachment structure 500 is different than a mere weld joint joining two parts together, but is itself both a part (e.g., a curved beam) and a joint between parts 502, 504. In FIG. 6, the example prefabricated metallic parts 502, 504 are I-beams, and the attachment structure 500 is a curved beam having an internal opening 506. One of ordinary skill in the art can appreciate numerous prefabricated parts that could be joined by a third part that is additively manufactured as an attachment structure, such as wheel spokes to a hub, or boom excavator arm rails to a joining knuckle.

Figure 8:
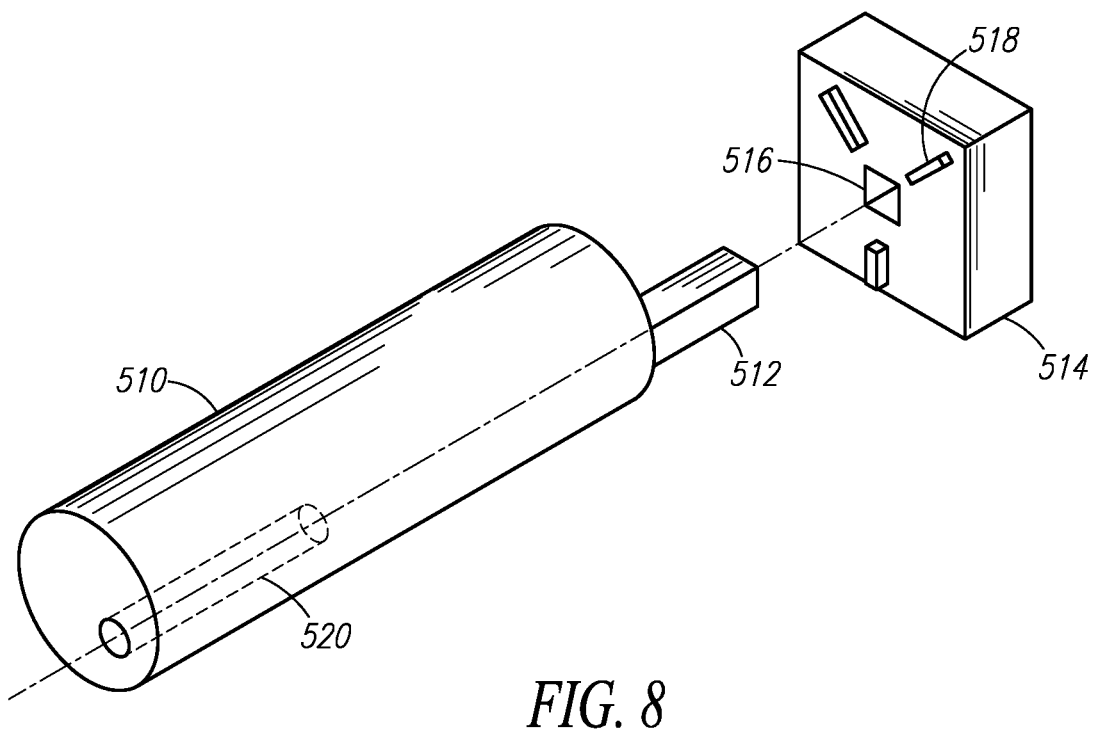
FIG. 8 illustrates an example additively manufactured part and a postprocessing fixture for the part.

FIG. 8 shows a further example part 510 that can be manufactured using one or more of the additive manufacturing systems described above. The part 510 includes an integrally-formed attachment structure 512. The attachment structure 512 is shaped and located on the part 510 to correctly orient the part in a fixture 514. The fixture 514 holds the part 510 for postprocessing machining of the part (e.g., drilling, cutting, etc.) Thus, the fixture 514 can be considered a postprocessing fixture. The fixture 514 can be part of a computer numerical control (CNC) machine tool. The additively manufactured attachment structure 512 provides a self-fixturing feature for the part, so that it is correctly positioned in the fixture with minimal custom setup of the fixture required. In FIG. 8, the attachment structure 512 is in the form of a bar or pin that is received in an opening 516 in the fixture 514. The fixture 514 can have clamps 518 or other securing mechanisms for holding the part 510 in the fixture. The example part 510 is cylindrical; however, the example attachment structure 512 is radially offset from the central axis of the cylinder, to correctly align the cylinder for postprocessing machining by a tool (e.g., drilling a bore 520 that is radially offset from the central axis of the cylinder). The additively manufactured part 510 can be defined by a CAD model. The CAD model can include the attachment structure 512, which physically corresponds to the configuration of the intended postprocessing fixture. A controller for the additive manufacturing system will deposit material at areas defined by the CAD model of the part, to form the part and its attachment structure. The attachment structure 512 can be manually added to the CAD model of the part 510 by an operator or programmer, for example. However, in certain embodiments, the attachment structure can be automatically generated by a processor, based on a selected postprocessing fixture or machining operation and the shape or structural details of the part.

Additively manufactured parts tend to have a high surface roughness compared to cast or forged parts, for example. This is due to the layer by layer buildup of the part and the resulting surface irregularities. There are various know ways to characterize surface roughness, such as average roughness $R_a$ or root mean square roughness $R_q$, for example. Other roughness parameters will be known to one of ordinary skill in the art. With additively manufactured parts, it can be challenging to create dimensionally critical edges, such as mounting edges or terminal edges that must accurately align with another other components. Such dimensionally critical edges may be created by postprocessing machining. However, it may be difficult to accurately mount the part in a fixture due to the high surface roughness of the part or low resolution of the additive manufacturing process. If the additively manufactured part is made from a hard metallic material, such as 41xx steel, it can be difficult to cut dimensionally critical edges or surfaces into the part. However, this could be accomplished using a plasma cutter to remove a portion of the part to create a cut surface having a lower average roughness than the "printed" exterior surface of the part.

Figure 9:
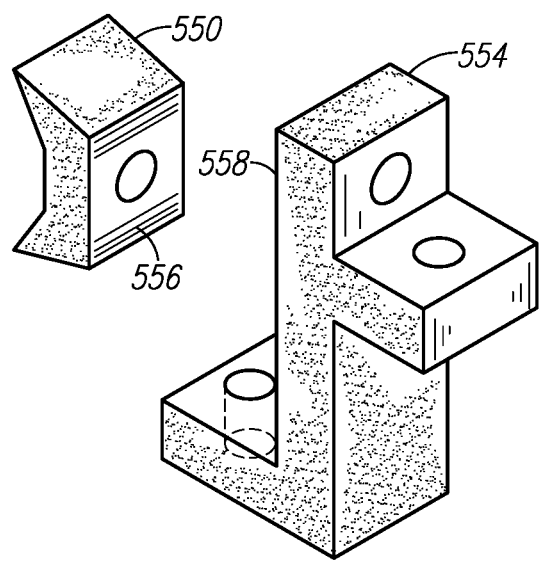
FIG. 9 illustrates an example additively manufactured part.
Figure 10:
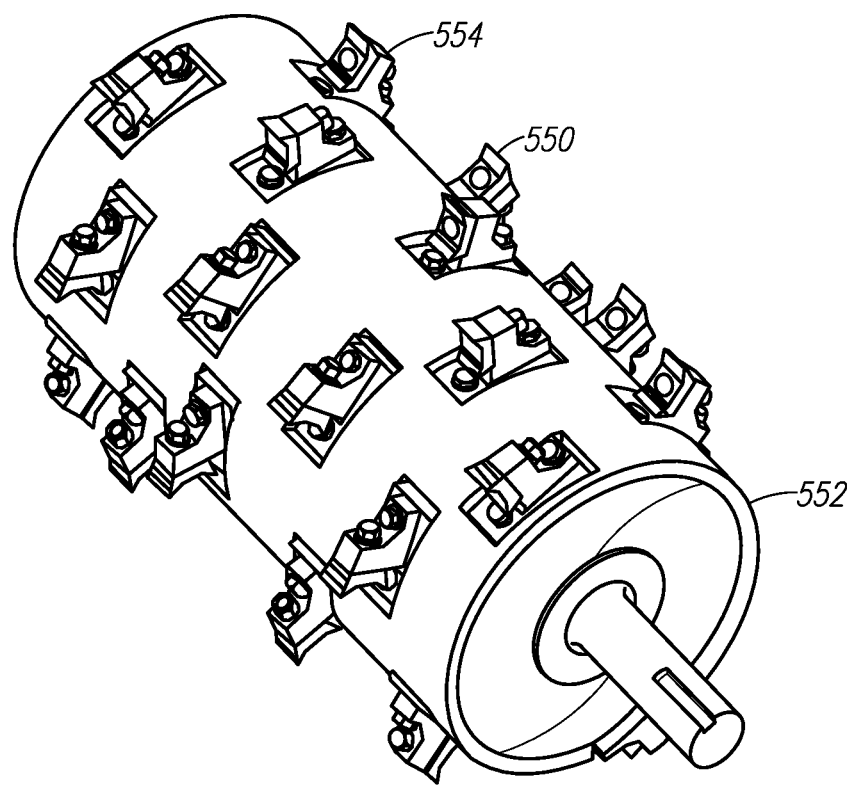
FIG. 10 illustrates a portion of a fragmenting machine having additively manufactured parts.

FIGS. 9 and 10 show parts of a fragmenting machine that may be additively manufactured using one or more of the processes described above, and then postprocessed by plasma cutting to form dimensionally critical cut surfaces (e.g., mounting surfaces) having a lower average roughness than the remainder of the exterior surface of the part (e.g., the printed surfaces). Fragmenting machines, such as wood shredders, are designed to splinter and fragment waste materials using hard impacting and shearing teeth 550. The teeth 550 can be mounted to a rotor 552 that spins to shred the waste material and drive it through a discharge screen. The teeth 550 can be mounted directly to the rotor 552 or attached to a mounting block 554. The teeth 550, rotor 552 and/or mounting block 554 can be additively manufactured. The teeth 550 and optionally the mounting block 554 can be made of a hard metal, such as 41xx steel. To correctly mount a tooth 550 to its respective mounting block 554, a plasma cut surface 556 can be created on the tooth, and a corresponding plasma cut surface 558 can be created on the mounting block. The plasma cut surfaces will have sharp edges and a lower average roughness than other portions of the tooth 550 and mounting block 554.

The additively manufactured parts described herein can be made using one or more of the additive manufacturing systems or processes discussed above. The parts can be made from multiple metallic materials to have specific desired properties. For example, using the multiwire system shown in FIGS. 1 and 2, parts can be manufactured to have more ductile inner portions, while having harder outer portions, to reduce the propagation of cracks though the part. As discussed above, some of the electrodes 32 in the array 30 can be made of a more ductile or lower hardness material (e.g., low carbon steel) as compared to the other electrodes, which may be formed from a harder and less ductile material (e.g., alloy or high carbon steel). The more ductile material can be used to form the inner portion of the part, and the hard material can be applied as an outer coating.

Figure 11:
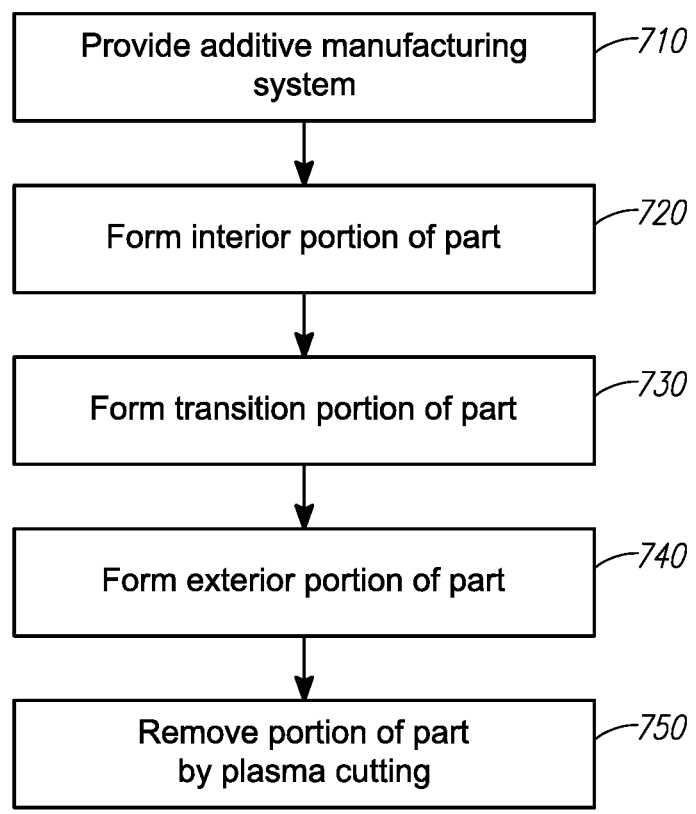
FIG. 11 illustrates a flow chart of an example method of additively manufacturing a part.

FIG. 11 illustrates a flow chart of an example embodiment of a method to additively manufacture a part, (e.g., to limit crack propagation through the part). At 710, the additive manufacturing system is provided. The additive manufacturing system can include an electrode head comprising an array of multiple electrodes for depositing material layer by layer to form a part, wherein the array of multiple electrodes includes a first plurality of electrodes formed from a first metallic material having a first ductility and a first hardness, and a second plurality of electrodes formed from a second metallic material having a second ductility and a second hardness, wherein the first ductility is greater than the second ductility and the second hardness is greater than the first hardness. The additive manufacturing system can further include a power source configured to provide electrical power for establishing a welding arc for each electrode of the array of multiple electrodes, a drive roll system configured to drive each electrode of the array of multiple electrodes, and a controller operatively connected to the power source. The method further includes additively manufacturing the part from at least the first plurality of electrodes and the second plurality of electrodes. Additively manufacturing the part can include forming an interior portion of the part using the first plurality of electrodes 720. The method can further include forming a transition portion of the part 730, extending between the interior portion and the exterior portion, using both of the first plurality of electrodes and the second plurality of electrodes such that the transition portion is an alloy formed from the first metallic material and the second metallic material. A proportion of the first metallic material to the second metallic material can decrease through the transition portion from the interior portion to the exterior portion. The step of forming the transition portion 730 can include adjusting active numbers of electrodes of both of the first plurality of electrodes and the second plurality of electrodes during additive manufacturing, to adjust the proportion of the first metallic material to the second metallic material from the interior portion to the exterior portion. The method can further include forming an exterior portion of the part 740, surrounding the interior portion of the part, using the second plurality of electrodes. The ductility of the interior portion of the part can be greater than ductility of the exterior portion of the part to limit crack propagation through the part. The method can further include removing a portion of the part by plasma cutting the part to form a cut surface of the part, wherein the cut surface has a lower average roughness than said exterior portion 750.

Figure 12:
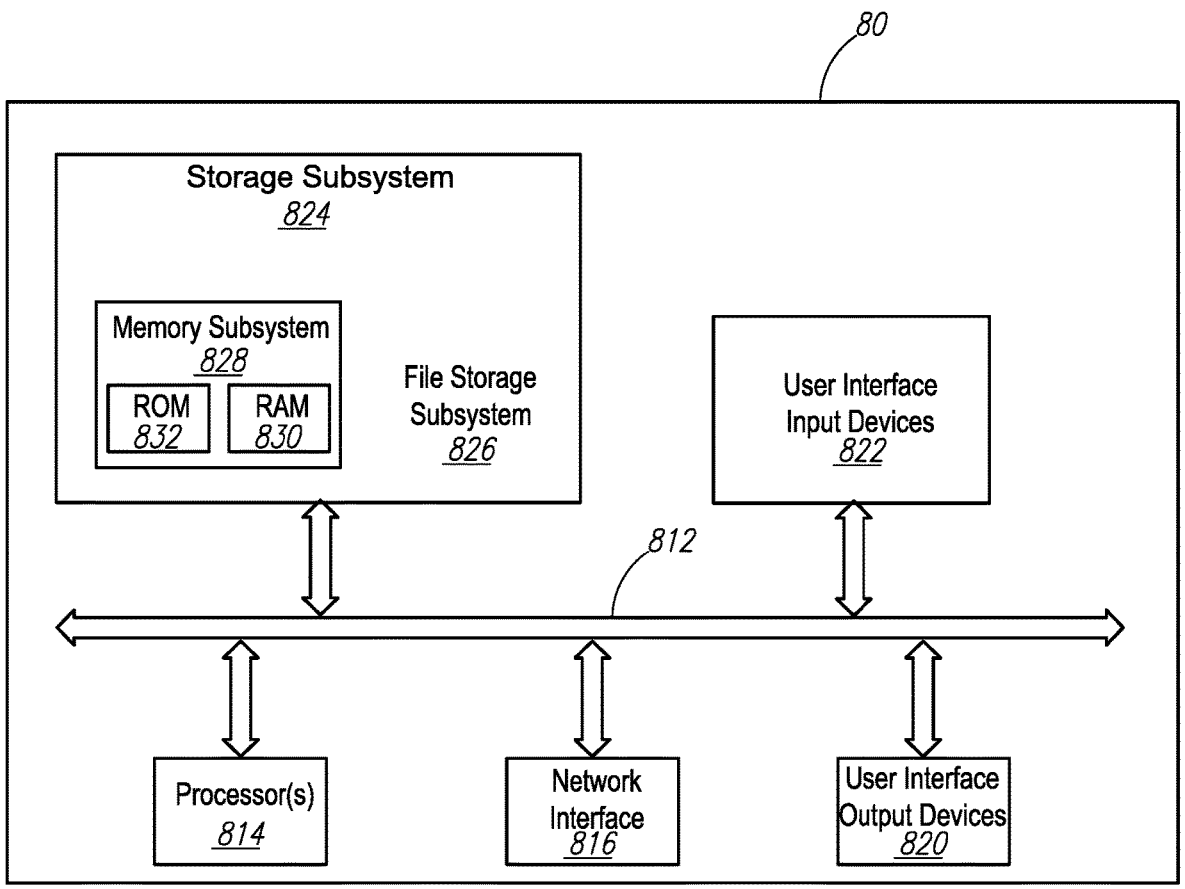
FIG. 12 illustrates an embodiment of an example controller of an additive manufacturing system.

FIG. 12 illustrates an embodiment of an example controller 80 of an additive manufacturing subsystem. The controller 80 includes at least one processor 814 which communicates with a number of peripheral devices via bus subsystem 812. These peripheral devices may include a storage subsystem 824, including, for example, a memory subsystem 828 and a file storage subsystem 826, user interface input devices 822, user interface output devices 820, and a network interface subsystem 816. The input and output devices allow user interaction with the controller 80. Network interface subsystem 816 provides an interface to outside networks and is coupled to corresponding interface devices in other computer systems. For example, the motion controller 180 of the system 100 may share one or more characteristics with the controller 80 and may be, for example, a conventional computer, a digital signal processor, and/or other computing device.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 80 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 80 to the user or to another machine or computer system.

Storage subsystem 824 stores programming and data constructs that provide the functionality of some or all of the modules described herein. For example, the storage subsystem 824 may include a CAD model of a part, such as a tool, to be additively manufactured and the logic to identify variations in a welding location and adjust a welding device to accommodate the identified variations.

These software modules are generally executed by processor 814 alone or in combination with other processors.

Memory 828 used in the storage subsystem can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 826 in the storage subsystem 824, or in other machines accessible by the processor(s) 814.

Bus subsystem 812 provides a mechanism for letting the various components and subsystems of the controller 80 communicate with each other as intended. Although bus subsystem 812 is shown schematically as a single bus, alternative embodiments of the bus subsystem may use multiple buses.

The controller 80 can be of varying types including a workstation, server, computing cluster, blade server, server farm, or any other data processing system or computing device. Due to the ever-changing nature of computing devices and networks, the description of the controller 80 depicted in FIG. 12 is intended only as a specific example for purposes of illustrating some embodiments. Many other configurations of the controller 80 are possible having more or fewer components than the controller depicted in FIG. 12.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof

What is claimed is:

1. An additive manufacturing system, comprising:
   an electrode head comprising an array of multiple electrodes for depositing material layer by layer to form a three-dimensional (3D) attachment structure connecting a first prefabricated metallic part and a second prefabricated metallic part, wherein the array of multiple electrodes includes a first plurality of electrodes formed from a first metallic material having a first ductility and a first hardness, and a second plurality of electrodes formed from a second metallic material having a second ductility and a second hardness, wherein the first ductility is greater than the second ductility and the second hardness is greater than the first hardness;
   a power source configured to provide power for heating each electrode of the array of multiple electrodes;
   a drive roll system configured to drive each electrode of the array of multiple electrodes; and
   a controller operatively connected to the power source and configured to:
      control operations of the additive manufacturing system to form an interior portion of the attachment structure using the first plurality of electrodes, and
      control the operations of the additive manufacturing system to form an exterior portion of the attachment structure, surrounding the interior portion of the attachment structure, using the second plurality of electrodes, such that ductility of the interior portion of the attachment structure is greater than ductility of the exterior portion of the attachment structure.

2. The additive manufacturing system of claim 1, wherein the electrodes of the array of multiple electrodes are consumable welding wires.

3. The additive manufacturing system of claim 1, wherein the controller is programmed to operate the additive manufacturing system to deposit the material at areas defined by a computer aided design (CAD) model of the attachment structure.

4. The additive manufacturing system of claim 1, wherein the first prefabricated metallic part and the second prefabricated metallic part are forged metallic parts.

5. The additive manufacturing system of claim 1, wherein the first prefabricated metallic part and the second prefabricated metallic part are cast metallic parts.

6. The additive manufacturing system of claim 1, wherein the controller is configured to control the operations of the additive manufacturing system to form a transition portion of the attachment structure, extending between the interior portion and the exterior portion, using both of the first plurality of electrodes and the second plurality of electrodes such that the transition portion is an alloy formed from the first metallic material and the second metallic material.

7. The additive manufacturing system of claim 6, wherein a proportion of the first metallic material to the second metallic material decreases through the transition portion from the interior portion to the exterior portion.

8. An additive manufacturing system, comprising:
   an electrode head comprising an array of multiple electrodes for depositing material layer by layer to form a three-dimensional (3D) part, wherein the array of multiple electrodes includes a first plurality of electrodes formed from a first metallic material having a first ductility and a first hardness, and a second plurality of electrodes formed from a second metallic material having a second ductility and a second hardness, wherein the first ductility is greater than the second ductility and the second hardness is greater than the first hardness;
   a power source configured to provide power for heating each electrode of the array of multiple electrodes;
   a drive roll system configured to drive each electrode of the array of multiple electrodes; and
   a controller operatively connected to the power source and configured to:
      control operations of the additive manufacturing system to form an interior portion of the part using the first plurality of electrodes, and
      control the operations of the additive manufacturing system to form an exterior portion of the part, surrounding the interior portion of the part, using the second plurality of electrodes, such that ductility of the interior portion of the part is greater than ductility of the exterior portion of the part, wherein the controller is programmed to operate the additive manufacturing system to deposit the material at areas defined by a computer aided design (CAD) model of the part, and wherein said computer aided design (CAD) model defines an attachment structure for the part that physically corresponds to a postprocessing fixture for holding the part during postprocessing machining of the part.

9. The additive manufacturing system of claim 8, wherein the electrodes of the array of multiple electrodes are consumable welding wires.

10. The additive manufacturing system of claim 8, wherein the attachment structure is shaped to align the part in the postprocessing fixture based on the postprocessing machining to be performed.

11. The additive manufacturing system of claim 8, wherein the controller is configured to control the operations of the additive manufacturing system to form a transition portion of the part, extending between the interior portion and the exterior portion, using both of the first plurality of electrodes and the second plurality of electrodes such that the transition portion is an alloy formed from the first metallic material and the second metallic material.

12. The additive manufacturing system of claim 11, wherein a proportion of the first metallic material to the second metallic material decreases through the transition portion from the interior portion to the exterior portion.

* * * * *